Patented June 5, 1928.

1,672,304

UNITED STATES PATENT OFFICE.

MARVIN L. CHAPPELL, OF EL SEGUNDO, GEORGE J. ZISER, OF LOS ANGELES, AND ERNEST L. MOYER, OF HERMOSA BEACH, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE.

PROCESS OF PURIFYING MINERAL OILS.

No Drawing. Application filed August 18, 1924. Serial No. 732,735.

This invention relates to a process of purifying mineral oils, and refers particularly to a process of purifying viscous mineral oil fractions from emulsifying constituents or constituents which operate to prevent or hinder decolorization of the oil.

In the refining of mineral or petroleum oil for the production of lubricating oils or water-white medical oils, it is common practice to treat the oil with sulfuric acid to remove certain unsaturated and other undesirable constituents from the oil. This sulfuric acid treatment produces certain polymerized oxy- and oxy-sulfo compounds which have a preferential oil solubility so that these compounds remain in solution in the oil after the acid sludge resulting from the treatment has been separated from the oil. These compounds cannot be completely removed from the oil by means of any of the well known methods of washing with water and neutralizing with caustic soda. Upon any such attempt to wash this treated oil and neutralize the same with caustic soda, such compounds will cause the formation of an emulsion of oil and water. This is particularly true when the petroleum or mineral oil used is of an asphaltic or mixed base containing a large percentage of hydro-carbons of the carbocyclic series.

That proportion of those emulsifying constituents which is removed by neutralization with caustic soda and washing with water is emulsified with a certain percentage of the treated oil. The loss commonly resulting through this neutralization amounts to between 3% and 11% by volume of the treated oil, and at best only an imperfect separation of the emulsifying constituents can be obtained. That portion of the emulsifying constituents remaining in solution in the treated oil will cause the same to form emulsions when used in systems where the oil comes in contact with water, particularly when it comes in contact with sea-water. Moreover in the production of medical oil the emulsifying constituents operate to hinder the complete decolorization of the oil and are difficult to remove to provide properly purified oil.

An object of the present invention is to provide a method for purifying petroleum oils so that a refined lubricating oil or medical oil may be obtained which is free from these emulsifying constituents and which will not emulsify when commingled with water or soda solution.

Another object of the present invention is to provide a process and method of treating petroleum oils by which the loss of oil in the treating process due to emulsification may be substantially reduced.

We have found that if acid treated lubricating oil is treated with concentrated alcohol containing at least 90% by volume of alcohol, the oil may be substantially freed of these emulsifying constituents. Moreover if the acid treated oil is neutralized by an alcoholic caustic solution containing at least 90% by volume of alcohol the oil may be neutralized without the formation of an emulsion and the greater part of the emulsifying constituents will pass into the alcoholic caustic solution, which will rise to the top of the oil and can be siphoned off or otherwise separated therefrom. Moreover, any remaining emulsifying constituents in the neutralized oil can be substantially completely removed by further washing the neutralized oil with concentrated alcohol, with the result that a lubricating oil can be prepared which will not emulsify when commingled with water or caustic soda solution and can be readily clarified and decolorized.

Further objects and advantages of the present invention will appear from a detailed description of a preferred process embodying the invention.

For the production of lubricating oils or medical oils, a viscous fraction of petroleum oil is first treated with sulfuric acid to remove certain tarry bodies, unsaturated hydrocarbons. The amount of sulfuric acid employed in the treatment will depend upon the quantity of oil to be treated and the purpose to which the finished product is to be put. In some cases the oil may be given several treatments in succession of sulfuric acid, removing after each treatment the acid sludge formed. After the desired quantity of tarry bodies, unsaturated hydrocarbons, have been removed from the oil, the final sludge is drawn off. To remove the last traces of sludge, in some cases, it may be preferable to agitate the oil with a small quantity of water in order to gather traces of sludge which have not settled out. This gathered sludge is then permitted to settle and is withdrawn.

For illustration a lubricating oil distillate of 19° or 20° Baumé gravity may first be treated with a quarter pound of 66° Baumé sulphuric acid per gallon of oil and subsequently with successive applications of one-half pound of 15° fuming sulphuric acid per gallon of oil, the acid being agitated with the oil and the sludge formed being removed prior to the application of each succeeding portion of the acid used.

The acid treated oil is then in condition to be neutralized and freed from the emulsion producing constituents. The treatment hereafter may be modified in several manners, but it is preferable to treat the acid treated oil with an alcoholic caustic solution in order to neutralize the same. This alcoholic caustic solution should contain over 90% alcohol and a small quantity of caustic soda or other neutralizing agent. We find it preferable to employ an alcoholic caustic solution containing 95% alcohol and 3% caustic soda. The quantity of alcoholic caustic solution to be employed is that at least sufficient to neutralize all acid bodies contained in the acid treated oil, and this alcoholic caustic solution is agitated with the oil by suitable means, such as air agitation. We prefer to use ethyl or methyl alcohol or a mixture thereof. After thorough agitation to enable the alcoholic caustic solution to completely neutralize the oil, the commingled oil and alcoholic caustic solution is permitted to settle. The commingled oil and alcoholic caustic solution may be heated to a temperature around 130 to 160° F. during the agitation period, as heating will facilitate the later separation of the alcoholic solution and oil; however, this feature of the process may readily be dispensed with.

After stratification of the alcoholic caustic solution from the treated oil, the alcoholic caustic solution is drawn off, this solution comprising the top layer.

The treatment with alcoholic caustic solution, which contains greater than 90% alcohol, removes the larger part of the emulsion producing constituents from the oil. For further purification and removal of traces of caustic, the neutralized oil is preferably then washed with concentrated alcohol free from caustic, the alcohol being preferably 95% in strength and at the least 90% in strength. The quantity of alcohol used in this washing step may be widely varied, but we prefer to employ about 10 to 30% of the volume of oil undergoing treatment. This alcohol is agitated with the oil by means of compressed air or any other preferred method of agitation and then permitted to stratify, the alcohol rising to the top, where it can be withdrawn. One alcohol washing following the alcoholic caustic neutralization will frequently completely remove the emulsion producing constituents; however, for complete removal it may be desirable to repeat the alcoholic washing.

At this step of the process we prefer to test the oil for emulsifying constituents. This is best done by removing a sample of the oil and finishing the oil in the usual way by treatment with a clarifying and decolorizing agent, such as fuller's earth or the like the oil being then tested as to its emulsifying properties. If it is shown by the test that the oil has not been sufficiently purified, then another treatment of alcohol may be applied to the oil, and this treatment continued until the oil is thoroughly purified of the emulsion producing constituents. Two washings will be found in nearly all cases sufficient to remove these undesirable constituents. The purified oil is then finished by filtration through a clarifying and decolorizing agent.

The acid treated oil may also be purified by slightly modifying the procedure, as follows:

The acid treated stock may be neutralized by any well known method, for example, the oil may be neutralized, after acid treatment and water gather, with a water solution of caustic soda, or water solution of dilute alcohol and caustic soda, the commingled caustic solution and oil being first heated until separation takes place. In this case, the lower layer will constitute the neutralizing solution, and is drawn off from the oil. The neutralized oil may then be treated with an alcoholic wash in which the wash solution contains greater than 90% alcohol, the oil being tested after the wash to determine if emulsifying constituents are completely removed. In case one alcohol wash is not sufficient to complete the removal of emulsion producing constituents, the oil may receive further washing with an alcoholic solution greater than 90% until completely purified.

An advantage of this solution is that we are able to obtain a refined lubricating oil which will not emulsify when commingled with water, salt water or caustic soda solution, with an extremely low treating loss; and moreover, the treating process can be conducted more rapidly, due to the increased ease with which the different washing solutions separate from the oil. It is not necessary to heat the oil and alcoholic solution in order to cause separation, which is found to take place relatively rapidly at an ordinary temperature.

Another advantage of the present invention is that we are enabled to remove emulsifying constituents and oil soluble impurities from oil which is being refined for the production of medical oil with greater efficiency, with the result that the oil may be more rapidly decolorized and a greater yield of medical oil obtained than by the present process.

While the method of treating and purifying mineral oils herein described is well suited for accomplishing the purposes of this invention, it is not intended to limit the invention to the particular process described, as various modifications may be made without departing from the spirit of the invention. This invention is of the scope set forth in the appended claims.

We claim:—

1. A method of refining viscous petroleum oil stocks, comprising treating the viscous stock of an asphaltic base oil with sulfuric acid, removing the sludge produced, then neutralizing the oil with on alcoholic caustic solution containing over 90% by volume of alcohol, and thereafter washing the neutralized oil with alcohol greater than 90% in strength.

2. A method of purifying mineral oils after acid treatment which consists in neutralizing a viscous oil stock from an asphaltic base crude with an alcoholic caustic soda solution containing over 90% by volume of ethyl alcohol, then separating by decantation the purified oil from the neutralizing solution after stratification has taken place.

3. A method of purifying mineral oils after acid treatment which consists in neutralizing a viscous stock from an asphaltic base crude with an alcoholic caustic soda solution containing over 90% by volume of alcohol, then removing the emulsifying constituents by agitating the oil with an alcoholic solution containing over 90% of alcohol, and then separating the two liquids by decantation after stratification has taken place.

4. In the process of making lubricating oil the steps of acid treating the oil, removing the sludge thus produced, then repeatedly treating the oil with an alkali solution containing over 90% by volume of ethyl alcohol and repeatedly allowing the oil to separate gravitationally from such mixture.

Signed at El Segundo, Calif., this 25th day of July 1924.

MARVIN L. CHAPPELL.
GEORGE J. ZISER.
ERNEST L. MOYER.